United States Patent

[11] 3,628,811

[72] Inventor Melvin Rivers
Toledo, Ohio
[21] Appl. No. 868,307
[22] Filed Oct. 22, 1969
[45] Patented Dec. 21, 1971
[73] Assignee Magnatronic Controls, Inc.
Toledo, Ohio

[54] AUTOMATIC COUPLING DEVICE
9 Claims, 9 Drawing Figs.
[52] U.S. Cl. .................................................. 280/421,
280/422, 339/10
[51] Int. Cl. .................................................. B60d 1/08
[50] Field of Search .......................................... 280/421,
422; 213/1.3, 75; 285/9 M; 339/10, 12

[56] References Cited
UNITED STATES PATENTS
2,457,478 12/1948 Letvin .......................... 280/421
3,181,895 5/1965 Cator ............................ 285/1
2,226,287 12/1940 Miller ........................... 213/75

3,181,887 5/1965 Boylan et al. ................. 280/421
FOREIGN PATENTS
1,479,487 5/1967 France ......................... 339/10
1,556,679 2/1969 France ......................... 285/9 M

*Primary Examiner*—Leo Friaglia
*Attorney*—George R. Royer

ABSTRACT: A mechanism for use on a tractor-trailer rig for automatically connecting and disconnecting the tractor-trailer service lines and the kingpin of a trailer to and from the fifth wheel of a tractor, and specifically the invention incorporates a system based on mutually attracting magnetic plates for automatically connecting and disconnecting the auxiliary service line connections, and incorporated therewith is a rotatable plate member serving to hold one of the magnetic plate members and also serving as a rotatable base for such magnetic plate member so that it can be aligned with the other magnetic plate member whenever the tractor and trailer are not aligned properly; and further included in this invention is an automatic system for raising and lowering the dolly wheels on the trailer as an integral part of the operation of the system.

INVENTOR.
MELVIN A. RIVERS

BY

ATTORNEY

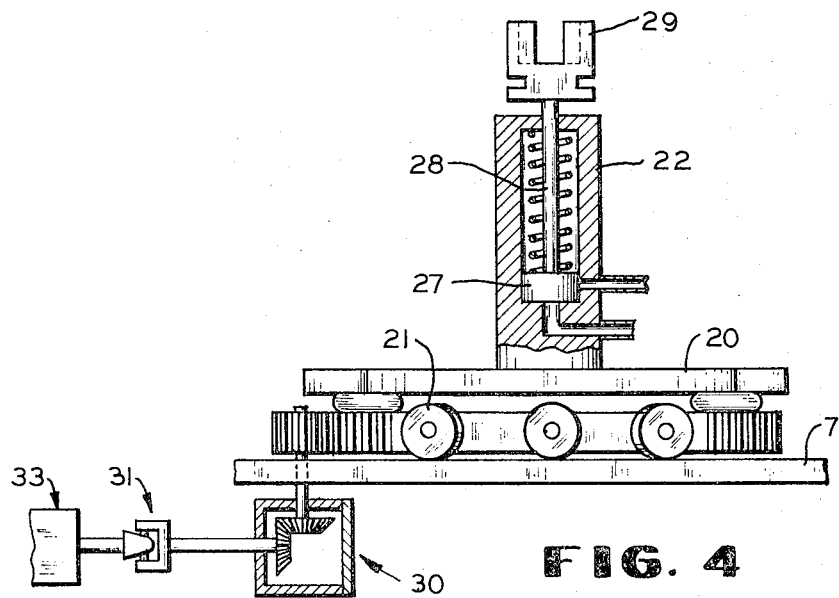
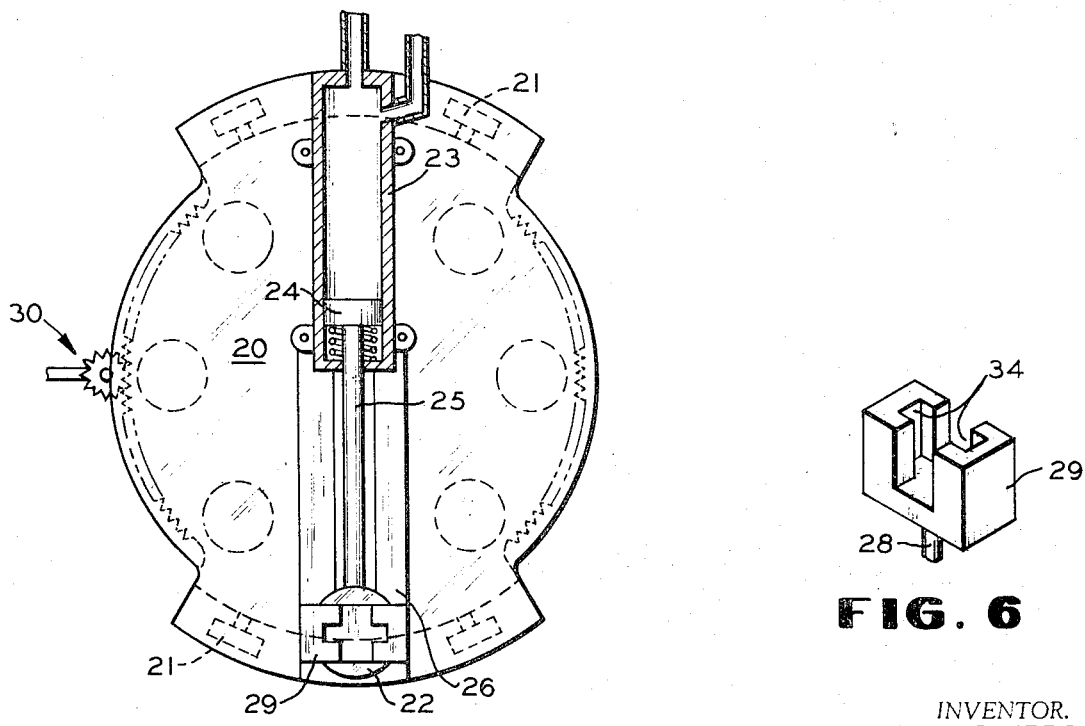

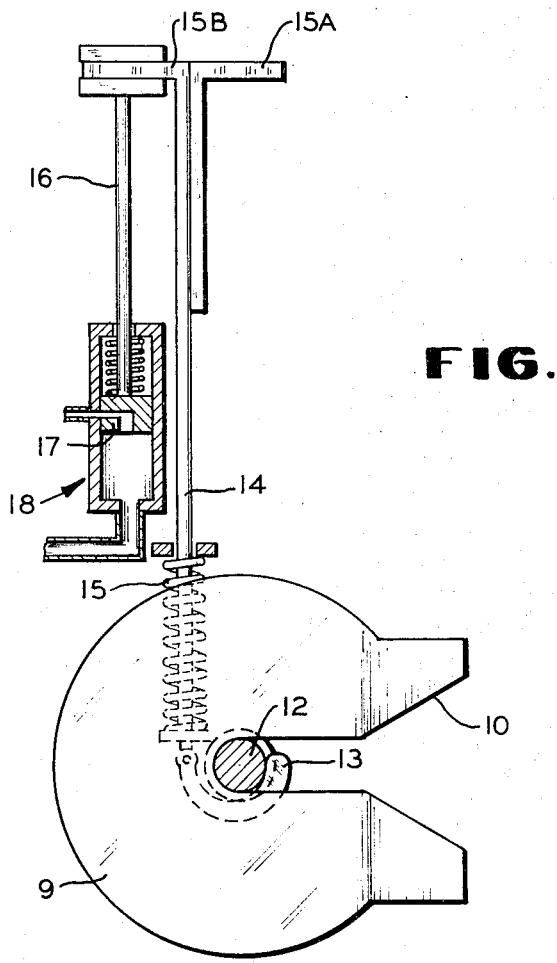
FIG. 7
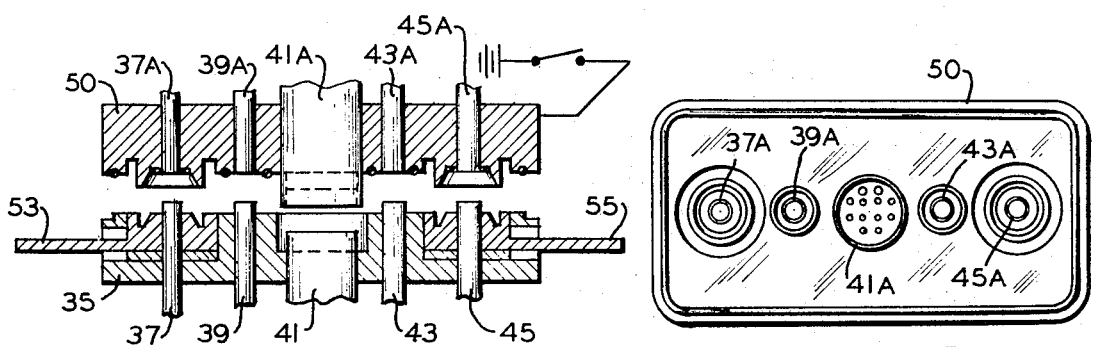
FIG. 9
FIG. 8
INVENTOR.
MELVIN A. RIVERS
BY
ATTORNEY

AUTOMATIC COUPLING DEVICE

CROSS-REFERENCE TO RELATED PATENTS

U.S. PAT. No. 3,391,950–CARTER

BACKGROUND OF THE APPLICATION

This invention relates to an automatic coupling system for highway tractor-trailer combinations. More specifically, this invention relates to novel means for connecting the service lines between the tractor and trailer, as well as automatic means for unlocking and locking the kingpin in place.

Tractor-trailer rig combinations include, in general, a kingpin coupling system which conventionally is referred to as a "fifth wheel" arrangement and which includes a horizontally disposed platelike member located on the rear of the tractor. The fifth wheel generally has a rearwardly extending slot therein for receiving a kingpin situated on the underbelly portion of the trailer. This fifth wheel is fixedly mounted on the rear bed of the tractor immediately on or about the tractor frame. In the usual arrangement, the kingpin is locked in place in the most forward position of the slot in the fifth wheel by a locking arm which is manually operated. This locking arm is adapted to move into a position immediately behind the kingpin in a locking relationship in order to lock the same firmly within the fifth wheel slot. This locking relationship enables the tractor and trailer to move forwardly together in a coupled and articulated manner.

In addition, in the usual connecting arrangement, there are service line connections for electrical and hydraulic powerlines, which must be completed between the tractor and trailer. In the conventional arrangement, these service lines are releasably connected, and these lines are generally connected or disconnected by a manual operation which generally requires the truck operator to leave the cab of the tractor.

A landing gear system for supporting the trailer without the aid of the tractor is provided below the underbelly of the trailer; this system being commonly referred to as the "dolly" wheels. In the conventional dolly wheel system there is an axle having two solid metal wheels on each end thereof, with supporting struts connecting the axle with the trailer. The axle and connecting struts are capable of movement through an appropriate gearing system, from a raised position adjacent to the underbelly to a fully lowered supporting position when the trailer is not connected to the tractor.

In the usual method of connecting the tractor and trailer, the tractor is backed into the stationary trailer so that the trailer kingpin can ride into the slot in the fifth wheel on the tractor. Once the kingpin reaches the most forward position in the slot in the fifth wheel, the operator must come down out of the tractor cab and manually manipulate the appropriate lever connected to the kingpin-locking arm. Once the kingpin is locked into place, the operator then must manually connect all electrical and hydraulic service lines. A third step is that of manually turning the crank for raising the dolly wheels to a retracted-upper position. Disconnecting operations proceed in the reverse sequence just described, still involving, however, similar manual operations on the part of the operator.

From the above description of the conventional tractor-trailer system, it can readily be seen that the manual operations involved present a problem of inefficiency, as well as a definite danger to the operation of the coupling system. These inefficient and dangerous manual operations have generally been performed in one, two, or three stages, depending on whether there is some degree of automation or remote controlling utilized. In all cases, nonetheless, difficult and hazardous circumstances still arise whenever even one manual step brings a person into close proximity with moving machinery or parts, as involved in the above-described coupling systems. The efficiency problem is obvious enough, in view of the fact that the operator must frequently move in and out of the tractor cab to effect a coupling connection.

There have been various arrangements invented, constructed, and patented in the coupling art relating to tractor-trailer rigs enabling the operator to perform all or part of the connecting and disconnecting operations remotely from the cab of the tractor, without requiring the operator to leave the tractor cab. Some of these inventions have been semiautomatic; while others have been fully automatic with complete remote control units such that there are no manual operations required on the part of the operator, in or out of the cab.

In general, many of these automatic devices have had limited success. In many, there is dependence on the relative movement between the tractor and trailer to initiate a connection or a disconnection of the service lines, as well as a locking or unlocking of the kingpin. Other purported automatic coupling systems do not provide a sufficiently positive disconnection for the service lines, and as a frequent result there is a rupture of one or more service lines when the tractor and trailer are separating.

Still other automatic coupling systems have been somewhat faulty in the respect that poor sequencing may lead to the dangerous condition of premature service line connections. A similar sequencing problem may be encountered whenever the landing gear is raised prematurely before an effective coupling of the kingpin in the fifth wheel of the tractor.

One of the most revolutionary inventions in the area of automatic tractor-trailer coupling systems has been seen in the invention as set forth in the Carter patent, (U.S. Pat. No. 3,391,950), which discloses a fully automated system for locking and unlocking the kingpin on the trailer to the tractor fifth wheel, including automatic means for connecting and disconnecting the service lines and raising and lowering the dolly wheels on the trailer. The Carter invention has been not only a revolutionary advance over the prior art, but also discloses a fairly practical and effective structural embodiment for automatically accomplishing the requisite steps necessary in the usual-coupling operation. While Carter's disclosure reveals a well-conceived invention, there are a few inherent disadvantages in the Carter structure. Specifically, Carter relies upon the interrelated movement and impact force of several mechanical parts to effect both the kingpin locking and the service line connection and disconnection. This interrelated movement and consequent impact creates a wear problem which is not conducive to long life. Additionally, the required procedure for aligning the male and female service line connector elements is somewhat cumbersome because of reliance on moving mechanical parts for such procedure.

In view of the above discussed problems and disadvantages encountered in prior automatic coupling systems for tractor-trailer rigs, it is an object of the present invention to provide a fully automatic and safe coupling system for a tractor-trailer rig.

It is also an object of this invention to provide a coupling system for a tractor-trailer rig which is fully and completely synchronized and sequenced. It is also an object of this invention to provide a coupling system for a tractor-trailer rig which can be operated completely and remotely from the cab of the tractor.

It is still another object of this invention to provide a coupling system for a tractor-trailer system wherein connection of the service lines on the tractor-trailer cannot be effected until the tractor-trailer have been positively connected by the fifth wheel locking arrangement.

Yet another object of the subject invention is to provide a coupling system for a tractor-trailer rig in which the "landing gear" will not be lowered until the service lines have been completely disconnected.

It is still another object of this invention to provide a coupling system in which the service line connections can be effectively completed under all road conditions.

It is also an object of this invention to provide an automatic tractor-trailer vehicle connecting system which has relatively few moving parts, thus eliminating substantial cost and wear.

It is yet another object of this invention to provide an improved coupling system for a tractor-trailer rig.

DESCRIPTION OF THE DRAWINGS

In describing this invention, reference is made to one basic, but specific embodiment represented in the following drawings, of which:

FIG. 4 is a side view of the rotatable baseplate situated on the tractor on which the locater for the male service block is located.

FIG. 5 is an elevational view of the rotatable baseplate member shown in FIG. 4.

FIG. 6 is a perspective view of the male block and its relationship to the locater block.

FIG. 7 is a top elevational view of the fifth wheel arrangement on the tractor showing schematically the hydraulic and mechanical means for disconnecting and connecting the locking arm for the kingpin.

FIG. 8 is a front elevational view of the male block on the tractor for the service line connections.

FIG. 9 is a sectional view of the male and female blocks for the service line connections, showing the male and female blocks in a position of proximity to their complete joinder.

SUMMARY OF THE INVENTION

Figure 1:
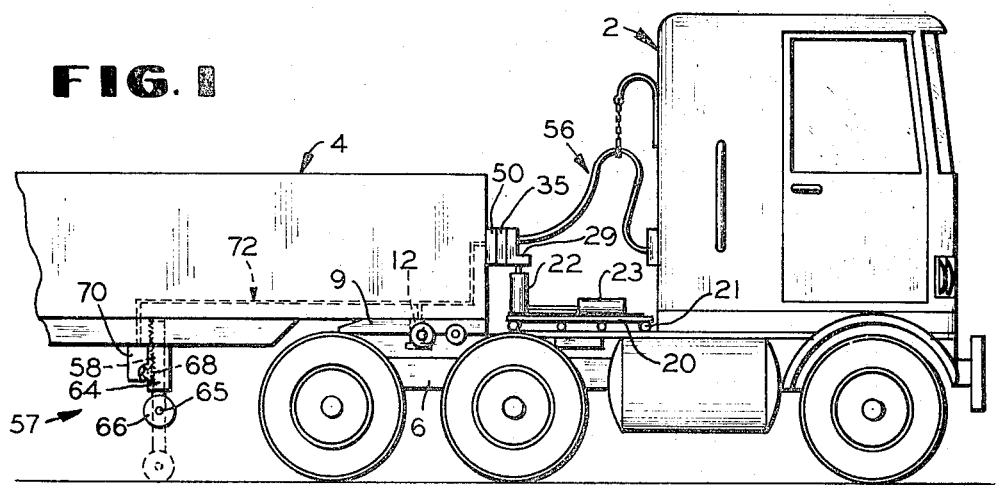
FIG. 1 is a side elevational view of a tractor-trailer rig showing the guiding element for the service line block on the tractor.
Figure 2:
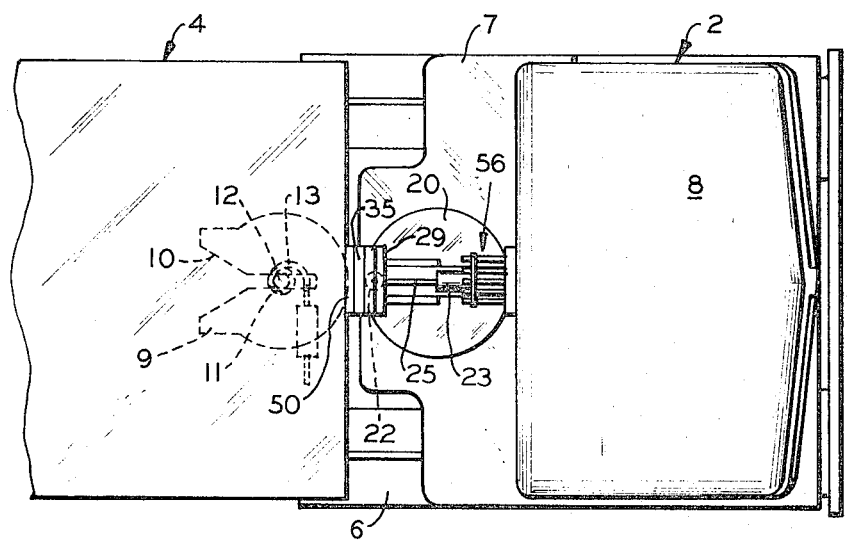
FIG. 2 is a top elevational view of the tractor-trailer rig showing the fifth wheel and the service line connection blocks.
Figure 3:
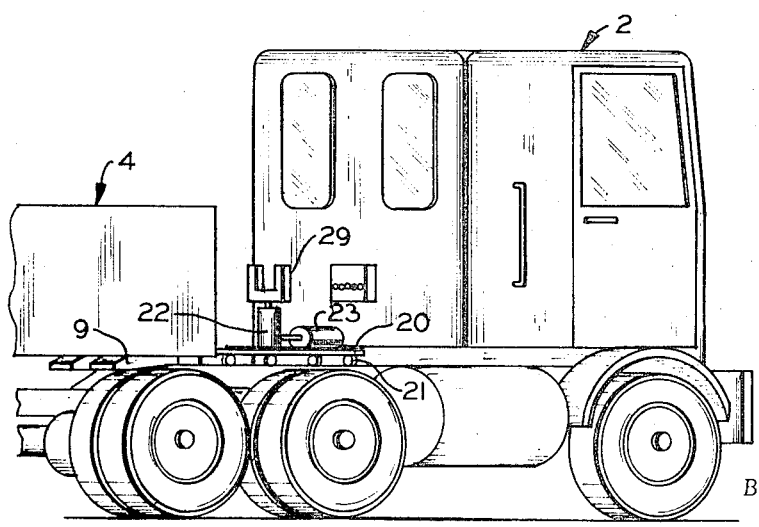
FIG. 3 is a perspective view of the tractor-trailer rig embodying the subject invention showing the locater for the male service line block situated on the tractor.

A coupling system embodied in the preferred form of the present invention includes locking arm means adapted for automatically connecting and locking the kingpin in the slot in the fifth wheel, male and female block means located on the tractor and trailer respectively for effecting the service line connections, and automatic means for lowering or raising the dolly wheels on the trailer. The male block is equipped with male fittings leading from the respective service line sources on the tractor, and these male fittings are adapted to fit into appropriate female service connections in the female block located on the trailer, for a complete service line connection from trailer to trailer. The female service line block is magnetized and is adapted to attract the male block in a coplanar relationship. The male block is made of a soft metal for the purpose of attraction to the magnetized female block member.

DESCRIPTION OF PREFERRED EMBODIMENT

In reference to the drawings, in which a preferred embodiment of the subject invention is described, a highway tractor 2 is attached to a trailer 4, as shown. Tractor 2 is basically a conventional tractor of the type usually seen in highway tractor-trailer rigs. A horizontally disposed frame 6 extends from the extreme forward end of the tractor 2 to the extreme rearward portion thereof. A horizontal deck 7 rests on that portion of frame 6 which is situated immediately behind a cab 8 located on the upper forward portion of tractor 2. Fixedly secured to the rear portion of frame 6 is a horizontally disposed fifth wheel 9. The fifth wheel 9, when viewed in elevation from above is generally round in geometrical configuration, and has a V-shaped slot 10 with the open end of the slot facing rearwardly. More particularly, slot 10 narrows as it approaches the center portion of fifth wheel 9, and at this center portion of the fifth wheel, a circular recess 11 is provided to receive a kingpin 12, connected to the underbelly of the trailer 4. Recess 11 has a diameter of sufficient size to receive kingpin 12 snugly therein.

A hooked-shaped locking arm 13 is adapted to engage the kingpin 12 and thereby lock it into position in the recess 11 in the slot 10 of the fifth wheel 9. While so locked, the forward driving force of the tractor 2 is transmitted mainly through the locking arm 13 to kingpin 12, and thus to trailer 4, thereby causing trailer 4 to move forwardly with the tractor 2 in a unitary fashion. A horizontally disposed-actuating bar 14, which is spring biased by a compression spring 15, serves to move the locking arm 13 in and out of locking engagement with the kingpin 12, in a conventional manner. Actuating bar 14 has a double handle lever arrangement, and in particular, one handle extension 15A, of which functions as a manual device for moving actuating bar 14 to operate the locking arm 13 in case of emergencies or malfunctioning of the automatic locking system. A second handle extension 15B, is provided adjacent to handle 15A on bar 14, and this handle cooperates with a rod 16, which is in turn fixedly secured to a piston 17 in air cylinder 18. Air cylinder 18 and the accompanying hydraulic system, not shown, can be actuated remotely from the cab 8 of tractor 2, by means of appropriate circuitry.

When air cylinder 18 is appropriately energized causing piston 17 to move to a retracted position in cylinder 18, it will cause rod 16 to move in the same direction, thereby causing bar 14 to move the locking arm out of its locking position. The locking process is accomplished by the reverse of the mechanical and hydraulic operations just described. The forcible locking and unlocking of kingpin 12 is facilitated by the compression spring 15 located at the inner portion of bar 14. In this respect, compression spring 15 serves as an additional mechanical spring-locking aid.

An electrical switch, not shown, and accompanying electrical connections leading to the cab 8 may be provided to serve as an indicator that the locking arm is in a locked or unlocked condition. An appropriate signal device, not shown, in the cab 8 of the tractor 2 may further serve to indicate to the operator of the truck when the kingpin is locked or unlocked in order that he may proceed with the other coupling and uncoupling operations accordingly.

Immediately forward of the fifth wheel 9 on the deck 7 of tractor 2 is a horizontally disposed plate 20 which is rotatably and pivotally mounted on deck 7 of the tractor. More specifically, the horizontal plate 20 is structured so as to be able to rotate on a series of rollers 21, in a direction 90° left or right about its pivot point. Fixedly mounted on the rotatable plate 20 are two air cylinders 22 and 23. Air cylinder 22 is vertically disposed relative to the plate 20, and air cylinder 23 is horizontally disposed relative to plate 20. More particularly, horizontally disposed air cylinder 23 is fixedly secured to the upper surface of rotatable plate 20. Further, the horizontally disposed cylinder 23 consists of a piston 24, a rod 25, and an extended support member 26 connected to the rod of the piston. Vertically disposed cylinder 22 is slidably supported on the plate 20 and is connected to the extendible member 26 of cylinder 23. As a consequence of this latter construction, cylinder 22 moves overplate 20 according to the relative position of extendible member 26 of cylinder 23. Vertical cylinder 22 has a piston 27, a rod 28, and a U-shaped locater bracket 29 located at the upper end of extendible rod 28.

In the case of each air cylinder, 22 and 23, separate remote control switches, not shown, are situated in the cab of tractor 2 for actuating the air cylinders 22 and 23, while a third electrical control switch, not shown, is provided to actuate rotation of rotatable plate member 20, the power for which rotation is supplied by way of gearing 30 from a power takeoff unit 33, schematically shown in FIG. 4. Power takeoff unit 33 is an adjunct to the tractor transmission, not shown.

Fixedly secured in appropriate slots 34 of the U-shaped locater bracket 29 is a male block member 35 which is generally a rectangularly shaped body, having a thickness of approximately 2 to 3 inches. The male block 35 has a series of male fittings 37, 39, 41, 43 and 45 on the rearwardly facing side indicated in FIG. 9, which male fittings protrude about 1 inch beyond face of the male block. These fittings correspondingly communicate to the respective connections for the appropriate service lines from the tractor 2 extending into the front face of the male block. In particular male fittings 37 and 45 are adapted to transmit air for airbrake purposes, while male fitting 41 is adapted to transfer electrical power required for various trailer accessories. Additionally, male fittings 39 and 43 are constructed to transfer and conduct air and fluid respectively for auxiliary hydraulic purposes to the trailer.

Fixedly secured in a flush manner with the forward vertical wall of trailer 4 is a rectangular female block member 50, which is about 3 to 4 inches thick. Female Block 50 has appropriate female openings, 37A, 39A, 41A, 43A and 45A corresponding to the appropriate male fittings, 37, 39, 41, 43 and 45 on the male block 35. Specifically, female openings 37A, 39A, 41A, 43A and 45A are adapted to receive the corresponding male fittings to complete the various electrical, hydraulic, and pneumatic connections between the tractor 2 and trailer 4. The female block 50 being fixedly secured to the forward wall of trailer 2, is not rotatable or movable relative thereto, and in this fixed position the forward face of the female block with the corresponding female openings are exposed and facing towards the front of the tractor 2. In the unconnected state, the rear face of male block 35 normally rests about 6 to 8 inches from the front face of female block 50, when the trailer kingpin is locked into the fifth wheel of the tractor.

Female block 50 is magnetized as a permanent magnet, preferably of the Ameko type, while the male block 28 is made of an appropriate soft metal. Thus, because of this magnetic attraction arrangement, the female block 50 and the male block 35 become readily aligned with one another, and then further drawn towards one another so that the corresponding male fittings 37, 39, 41, 43 and 45 become inserted in the respective female openings 37A, 39A, 41A, 43A and 45A, in the female block member. By this connected relationship, all service lines between the tractor and trailer are fully completed. The magnetic field of female block 50 can be eliminated by disconnecting the cab 8 of tractor an appropriate electrical switch, not shown, thereby cutting off electrical power to the magnet in female block 50.

Leading from the rear face of the male block 35 are the corresponding service lines 56, which in turn led into that part of tractor 2 containing the requisite auxiliary equipment for generating the electrical power, hydraulic and pneumatic pressures. These service lines connect through the male block to the respective male fittings 37, 39, 41, 43, and 45 as located on the opposite face thereof.

On the left and right end of the male block 35 are located left and right hand manual disconnect levers 53 and 55 respectively. These levers serve as manual means by which the male and female block can be disconnected to effect an emergency separation between these members and the service lines connected thereto.

Integrally disposed on the underbelly of trailer 4 is the dolly wheel structure 57, and specifically, a ratchet bar 58 is constructed coextensively with a strut 64 connected to axle 65 upon which is mounted a pair of wheels, one of which 66 is shown. The ratchet has a conventional series of teeth on its rear surface, these teeth being capable of a meshing engagement with a circular gear 68. Gear 68 is connected to and actuated by electric motor 70, which in turn is actuated by an appropriate electrical switch in the cab 8 of the tractor 2. This latter electrical circuitry is connected through the electrical service lines 72 by way of female fitting 41A and male fitting 41. As a consequence, the electric motor for the landing gear can only be operated when the male and female blocks are in a connected state.

When the electric motor 70 is actuated, it causes gear 68 to rotate, in turn causing the ratchet bar 58 to move the strut 64 vertically upward, lifting the wheels 66 off the ground. On reverse operation the gear 68 causes the strut 64 to be lowered vertically downwardly to place the wheels 66 on the ground.

In operation, the subject coupling system works as follows: tractor 2 is backed towards trailer 4 for the subsequent coupling operation. As the driver approaches the trailer, he actuates an appropriate switch in the cab of the tractor to actuate the power takeoff unit 31 to rotate the plate 20 in order to align the male block member 35 with the female block member 50, in situations where the trailer is not aligned with the tractor. In order to compensate for any vertical height differences between the male and female block, the vertical hydraulic cylinder 22 is actuated by a switch in the cab of the tractor. By appropriate and sufficient movement of the hydraulic cylinder 22 with the locater bracket 28 thereon, the male block is moved vertically to match the vertical height of the female block.

The driver proceeds to complete the process of driving backward to have the trailer kingpin 12 inserted in recess 11 in the fifth wheel 9. Once the kingpin is in place, the driver actuates an appropriate switch, actuating air cylinder 18, thereby pulling rods 16 and bar 14 outwardly away from the center of the fifth wheel. This causes locking arm 13 to engage kingpin 12 in a locking relationship.

Once the kingpin is locked into place, the driver actuates an appropriate switch in the cab of the tractor, activating horizontally disposed air cylinder 23 so as to move the locater bracket 28 rearwardly towards the female block 50. By this time, the operator will have thrown the appropriate switch to magnetize the female block 50 and when the male block and female block are facing each other about 8 inches apart, the magnetic force then takes over to attract the male and female block together in an appropriate engagement of the male and female fittings thereon for the connection of all service lines between the tractor and trailer.

Once the kingpin is locked and the service lines are connected, the driver actuates still another switch actuating the electric motor 70 to raise the dolly wheels, as hereinbefore described.

While one specific embodiment has been described for the embodiment of the subject invention, this shall not be construed as an intent on the part of the inventor-applicant to limit the scope of his invention or the claims set forth as follows:

I claim:
1. A coupling device for a tractor, with a rear deck, and a trailer rig, comprising in combination:
  a. A fifth wheel member located on the rear deck of the tractor.
     1. said fifth wheel having a longitudinal slot therein extending from the rear portion of said fifth wheel and extending substantially along the longitudinal axis of the tractor;
  b. A plurality of service lines extending from the tractor;
  c. A plurality of service lines extending from the forward end of the trailer;
  d. A coupling pin secured to the underbelly of the trailer rig,
     1. said coupling pin being adapted to be received within the longitudinal slot in said fifth wheel;
  e. A locking arm adapted to lock said coupling pin into the slot in the fifth wheel;
  f. A rotatable plate pivotally connected on the rear deck of the tractor;
  g. A female block member fixedly connected to the forward portion of the trailer.
     1. said female block being connected on one side thereof but all of said service lines extending from said trailer;
     2. said female block having on the side opposite the service line connections openings communicating individually with the service lines extending from the trailer;
     3. said female block being constructed of a magnetic material.
  h. A male block member having a first and second face secured to said rotatable plate;
     1. said male block having on the first face thereof connections with said service lines extending from the tractor;
     2. said male block having on the second face a plurality of male fittings thereon individually connected to the service lines from the tractor;
     3. said male block being made of a soft metal so as to be attracted to the female block;

i. Hydraulic means located on said rotatable plate member for moving the male block member into a juxtaposed relationship with the female block member; and
j. Dolly wheels structured on the underbelly of the trailer;
k. Automatic means located on the underbelly of said trailer for raising and lowering said dolly wheels.

2. In a coupling system for a tractor and trailer rig, the improvement comprising in combination (a) a magnetic member connected to the service lines on the trailer; said magnetic member having female fittings thereon; (b) a soft metal member with male fittings and being connected to the service lines on the tractor; (c) hydraulic means attached to the soft metal member for moving the soft metal member into position with the magnetic member so that they are magnetically attracted so as to draw the male fittings of the soft metal member into the female fittings of the magnetic member; (d) hydraulic means attached to the soft metal member for moving the soft metal into initial alignment with the magnetic member.

3. A coupling device for a tractor and trailer rig as described in claim 2 in which the female block member is permanently magnetized and is rigidly attached to the trailer rig.

4. A coupling system as described in claim 2 in which the means for moving the magnetic member and the soft metal together is a hydraulic cylinder arrangement.

5. In an automatic coupling device for a tractor-trailer combination, the improvement comprising a member holding the service lines on the tractor with magnetic properties for attracting the corresponding member on the trailer holding the trailer service lines and wherein the magnetic member on the tractor is hydraulically actuated.

6. An automatic coupling device for connecting service lines between a first station and a second station comprising in combination:
   a. a magnetized first block member having female fittings therein, said female fittings communicating with service lines extending from the first station;
   b. a rotating plate member which is rotatably affixed to the first station, said rotating plate member being pivoted so as to rotate about a vertical axis;
   c. hydraulic adjusting means on the rotating plate member on the second station.
   d. a second block member positioned on the top of said adjusting means, and being made of a soft metal, whereby it is readily attracted to the first block member, said second block member having male fittings thereon adapted to fit in the female fittings of said magnetized first block member, the male fittings communicating with service lines leading to the second station.

7. A coupling system as described in claim 6 in which said adjusting means are located on the first station.

8. A coupling system as described in claim 6 in which said magnetized first block is of the Ameko type.

9. A coupling system as described in claim 6 in which said second block member is moveable in a three-dimensional space by hydraulic means.

* * * * *